July 1, 1947.  O. E. ARMSTRONG  2,423,219
FENDER DEVICE FOR HEATED POTS
Filed Dec. 24, 1943
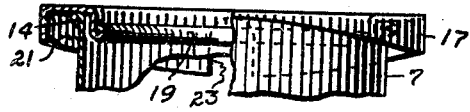
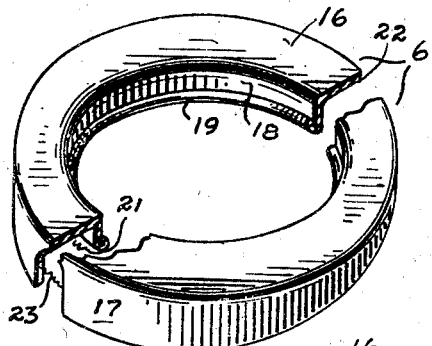
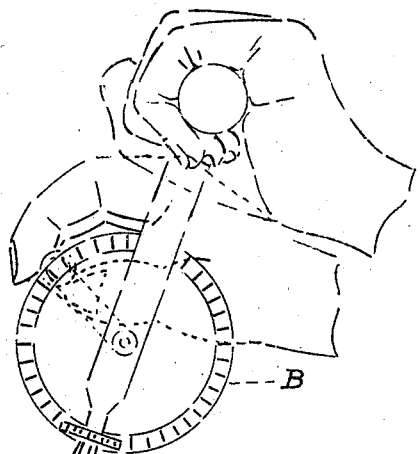
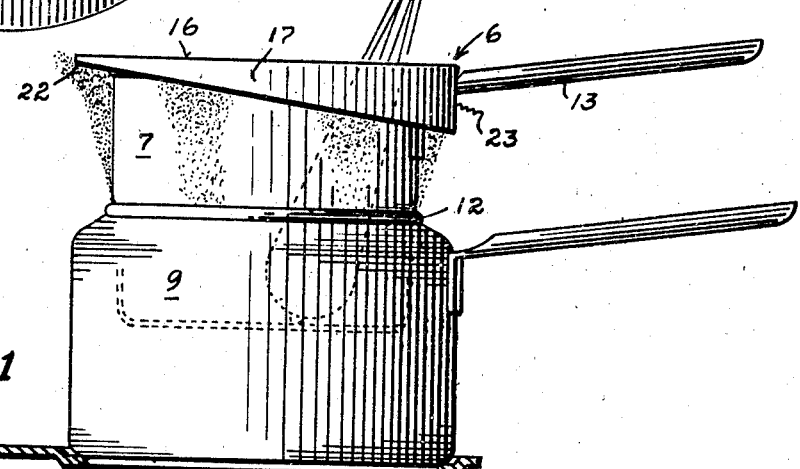
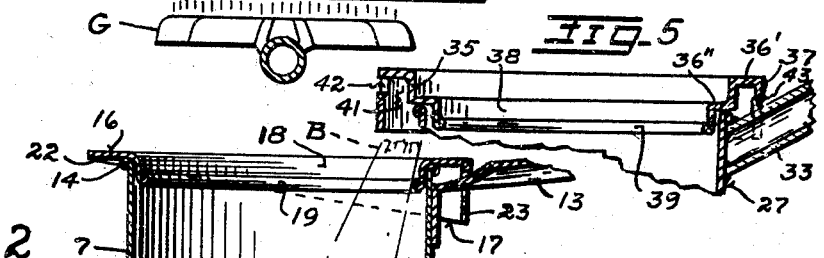
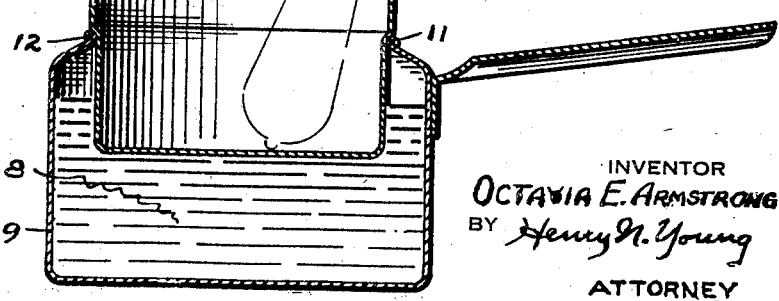
INVENTOR
OCTAVIA E. ARMSTRONG
BY Henry N. Young
ATTORNEY Patented July 1, 1947

2,423,219

UNITED STATES PATENT OFFICE 2,423,219

FENDER DEVICE FOR HEATED POTS

Octavia E. Armstrong, Salinas, Calif.

Application December 24, 1943, Serial No. 515,527

3 Claims. (Cl. 126—373)

The invention relates to a fender for a pot, or the like, which is arranged to have its contents manually worked while being heated with an accompanying flow of a hot gaseous fluid about and upwardly along it in a normally tubular stream.

A general object of the invention is to provide a simple and effective fender which is operative to minimize the danger of burning or scalding a person manually working the contents of an externally heated pot by localizing and diverting hot gases simultaneously rising from about the pot.

Another object is to provide a pot fender which protects the inner side of the pot rim portion against mechanical damage by an implement being used in working the pot contents.

A more specific object is to provide a fender of the type described which is particularly adapted for advantageous use as an attachment for a culinary double boiler.

The invention possesses other objects and features of advantage, some of which, with the foregoing, will be set forth or be apparent in the following description of typical embodiments thereof, and in the accompanying drawings, in which;

Figure 1 is a side elevation showing a fender member embodying the present invention as operatively applied to the cooking pot section of a culinary double boiler in which a stirrer is operative while heat is being applied to the pot contents from a heated water bath in the lower pot.

Figure 2 is a vertical axial section through the pot and fender assembly of Figure 1.

Figure 3 is a partly sectional front view of the fender and the upper part of the pot which mounts it.

Figure 4 is a perspective view of the fender member, portions of the fender being broken away diametrically of the fender to show the sections of the fender thereat.

Figure 5 is a fragmentary view corresponding to the upper portion of the showing of Figure 2 and disclosing a modified fender structure as applied to a slightly different upper pot of a double boiler.

As illustrating a particularly useful application of my invention, a fender element 6 is shown in Figures 1 to 4 inclusive as provided for and applied to the cooking pot 7 of a culinary double boiler assembly in which said pot has a bottom portion extending into a water bath 8 which is provided in an underlying pot 9 of the assembly and is arranged for its heating to boiling, as by a gas burner G. As is usual in culinary double boiler assemblies of the present type, the side of the cooking pot 7 is intermediately stepped inwardly thereabout to provide an annular external abutment 11 for direct supported engagement on the rim 12 of the pot 9 to support the pot 7 upon the pot 9 with the reduced bottom portion of the pot 7 in the water bath 8 for receiving cooking heat from the latter. The pot 9 has an appreciably greater diameter than the portion of the pot 7 extending into it, whereby to insure the fullest possible heat delivery from the boiling water bath and the steam arising from it about the pot 7 and its contents. The present pot 7 is provided with a handle 13 extending outwardly and more or less upwardly therefrom, and the bottom pot 9 is also provided with a handle.

By reason of the boiling of the water bath 8, the steam generated in the pot 9 escapes therefrom between the abutment 11 of the cooking pot 7 and the rim 12 of the pot 9, and flows upwardly along the exposed outside of the pot 7 to create a stream of steam and water vapor and heated air encircling the pot and normally continuing above it. Also, the air heated by the sides of the pot 9 provides part of said rising stream of heated gaseous fluids, which stream would also include any heated air and combustion products escaping upwardly from beneath the pot, as from the burner G. While the annular zone of hot gaseous fluid thus created has a positive value opposite the pot 7 toward maintaining the highest possible temperature in the pot contents, its functionless part above the pot may scald and/or burn a person's hand and/or arm being used in applying a working implement to the pot contents, or even for removing or replacing a cover on the pot. Accordingly, the present fender element has been designed and provided to eliminate the hazardous zone part above the pot 7, while retaining the heating function of the zone part opposite said pot.

For accomplishing the aforesaid and other useful purposes, the fender 6 essentially comprises a ring-like unit for centered mounting on the rim 14 of the cooking pot 7 and cooperative with the pot to provide an inverted trough arranged to intercept the hot gaseous stream arising along the heated pot and to direct the intercepted fluid laterally from the pot for its discharge at a predetermined and identifiable point with respect to the fender. The present fender thus leaves a major portion of the working space above the pot free of the hot fluids of said stream, while it provides a central opening through which the pot contents may be worked by a manually operated implement such as a stirrer or a spoon or a beater B of the type indicated in Figures 1 and 2. Also, the present fender unit is formed to protect the interior of the pot 7 adjacent its rim 14 from damage by contact therewith of an implement being applied to the contents of the pot, it being recalled that the food pots of culinary double boilers are frequently lined with ceramic enamels which are subject to cracking and chipping by impact.

In the present embodiment thereof, the fender unit 6 comprises a flat top portion 16 for supported disposal upon the pot rim 14 in substantially sealed engagement therewith and having tubular flanges or aprons 17 and 18 depending from it around its outer and inner edges respectively. The flange 18 is preferably provided with an inturned bead 19 at its bottom edge, and is arranged to fit within the top of the pot 7 for centering the mounted fender on the pot. When the fender 6 is mounted on the pot top, its outer flange 17 is cooperative with the opposed outer face portion of the pot side to define the sides of an annular downwardly-opening space 21 about the pot and beneath the fender top 16 for intercepting the stream of hot gaseous fluids rising about the pot during its heating, means being provided for permitting the escape of the intercepted, or trapped, said fluids from the top of the space for preventing their undue retention in the space. As particularly shown, the fender portion 16 and the outer flange 17 and the inner flange 18 and the bead 19 comprise integrally related parts of a unitary fender structure which may be formed by casting it, or by pressing it out of an initially flat blank of suitable sheet material.

While the discharge outlet from the space 21 may comprise an opening through the fender top 16 outwardly of its line of contact with a supporting pot rim 14, or an opening at the top of the flange 18, the latter is shown and is generally preferable. In the present fender unit, the bottom edge of the flange 18 defines a plane which extends obliquely downwardly from an edge point 22 of the top 16 at its under side, whereby to provide for the escape of the intercepted gaseous fluids from the space 21 at and adjacent said point. This arrangement provides for the escape of the hot fluid outwardly as well as upwardly from the fender and, by localizing the aforesaid fluid discharge, eliminates any danger of scalding or burning temperatures above and around the remainder of the fender.

In effect, the escape opening provided adjacent the point 22 comprises a notch extending from the flange bottom, it being understood that the particular design resulting from the present form of the flange 18 positively indicates to a person desiring to work the pot contents as to the pot side which is dangerous to work from as far as possible scalding or burning from hot fluids rising about the pot is concerned, and, conversely, the zone of safety. The fender top 16 may, of course, extend as far out from the pot as may be needed to insure the desired fending off of the hot fluids from the working space above the pot; in the present instance, the outside diameter of the fender is substantially that of the bottom pot 9.

It will now be noted that the handle 13 of the present cooking pot 7 extends outwardly and upwardly from a pot point which is so close to the pot rim 14 that the flange 17 must be notched out thereover to permit the desired circumferential supporting engagement of the rim with and beneath the fender portion 16. The fender point 22 might be positioned over the handle 13 for permitting a full seating of the fender on the pot rim, but this would result in the discharge of the hot gases at and around the handle by which the pot may be held in place while its contents are being worked or by which it may be removed from over a fire, and would therefore be unsatisfactory. Accordingly, and as shown, a handle-receiving notch 23 is preferably provided in the flange 17 at a point thereof diametrically opposite from the gas discharge point 22, said notch extending upwardly from the bottom of the flange to a high point thereof below the fender top 16 and shaped to freely receive the handle from its bottom; with such an arrangement, the discharge of the hot gases from the space 21 may still be assured at the point 22.

Cooking pots of culinary double boilers, and of other vessels with which the present fender device might be advantageously used, may have handles which extend upwardly through the planes of their rims so close to the rims that the top of a fender such as the fender 6 may not fully rest upon the rim as is required to provide the described fender operation. In such a case, and as is shown in Figure 5, the top 36 of a fender element 26 for mounting on a pot 27 having a handle 33 extending obliquely upwardly and outwardly from the pot side to intersect the plane of the pot rim 34 at a point relatively close to the rim and beyond which the fender should extend, may have its outer portion 36' stepped upwardly from its inner portion 36", with the latter top portion arranged to rest upon the rim 34 for supporting the fender thereon and being provided with a centering flange 38 depending from its inner edge and having an inwardly directed bottom edge bead 39.

A flange 37 depends from the periphery of the top portion 36' to a level below that of the inner top portion 36", and is cooperative with the opposed upright tubular portion 35 of the top 36 connecting its parts 36' and 36" and the upper end of the supporting pot 27 to define an annular space 41 below the top portion 36' for trapping hot gaseous fluids rising along the pot. The flange 37 corresponds in function to the flange 17 of the embodiment of Figures 1 to 4, but differs structurally therefrom in having its bottom edge parallel to the fender top portion 36" whereby the space 41 is arranged to be of uniform depth therearound. A notch 43 extends upwardly in the flange 37 to less than its full height for freely receiving the pot handle 33 therethrough, and an opening 42 is provided through the top of the flange at a point thereof diametrically opposite the notch 43 to provide for the discharge of the trapped gases outwardly and upwardly from the fender solely thereat.

In view of the preceding disclosures, it will be understood that both of the disclosed fender structures provide for a directed discharge of hot gaseous fluids flowing upwardly along the outside of a heated pot solely at a predetermined point spaced laterally of the pot, whereby to eliminate the hazard of a scalding or burning by the rising fluids at other points about the pot. It will also be noted that the support of the fender top in line engagement with the supporting pot rim prevents a flow of the fended-off gases into the top of the pot. Since the present fender units provide for their fluid control and fending actions independently of a handle on a pot mounting them, it will be obvious that the device of present invention is applicable to pots lacking attached handles, or having handles which are so shaped and/or positioned on the pots as to avoid any necessity of providing a handle-receiving notch in the exterior flange or apron of the fender to be used with them.

The inner flange in each present structure both centers the fender on the pot mounting it and guards the inner face of the upper pot portion adjacent the rim against damage by implements, such as the illustrated beater B, being applied in the pot. The outside diameter of the inner flange is preferably enough smaller than the average inside diameter at the rims of pots of a particular rated size as to avoid any forcible frictional engagement between the flange and pot during a mounting or dismounting of the fender, and thereby also provide for the free operative mounting of a present fender on pots having normal variations in size and shape at their tops. It will also be noted that a usual pot cover (not shown) may be applied at the interior fender opening, and that the present fender device is operative to protect the person applying or removing the cover.

In view of certain foregoing and other considerations, it will be understood that the present fender device is applicable generally to pots and other vessels having hot gaseous fluids rising along their outer sides from sources other than a liquid bath, as is particularly illustrated. Thus, fenders embodying the features of the present device may be advantageously used with such vessels as cauldrons, lead-melting pots, crucibles, and the like, arranged to have heat applied directly to their bottoms with the hot products of combustion and accompanying heated air flowing upwardly along their outer sides to create a burning or scalding hazard for a person working or removing their contents during the application of heat to the vessels. The device is, of course, applicable to heated vessels which are polygonal as well as circular in plan. Furthermore, the fending features of the device might be provided by an integral part of the pot at or below its rim, though such would be generally impractical for a domestic culinary pot, whether part of a double boiler or not.

From the foregoing description, taken in connection with the accompanying drawings, the advantages of the structure and use of the present fender device will be readily understood by those skilled in the art to which the invention appertains. While I have described the features and use of an arrangement which I now consider to be a preferred embodiment of my invention, I desire to have it understood that the showings are primarily illustrative, and that such indicated and other changes may be made, when desired, as fall within the scope of the following claim.

I claim:

1. In combination with an externally heated pot or the like arranged to have a hot gaseous fluid rising along and about its sides during its heating, a ringlike fender member comprising a top portion having a planar part arranged to supportedly rest upon the pot rim and having its peripheral edge spaced from its rim-engaging line, and a flange portion depending from the outer edge of the fender top portion and cooperative with the opposed pot side and the top portion to provide a space for receiving said rising fluid and provided with a fluid-escape outlet at a single point of its top, and a continuous flange portion depending from the inner edge of the fender top portion for its extension coaxially within the pot when the fender is mounted thereon.

2. In combination with an externally heated pot or the like having a handle extending radially outwardly from its side adjacent its rim and arranged to have a hot gaseous fluid rising along and about its side during its heating, a ringlike fender unit comprising a top portion having a planar part arranged to supportedly rest upon the pot rim and extending radially outwardly from the supporting rim to a lesser distance than the handle of the pot, and a flange portion depending from the peripheral edge of the fender top portion and cooperative with the opposed pot side and the top portion to provide an inverted channel space for intercepting the rising said fluid, said flange portion being provided with an opening having its highest point spaced below the fender top for freely receiving the handle while the fender is mounted on the pot and said fender being provided with a fluid-escape passage opening at a point thereof above the level of the top point of the handle-receiving opening.

3. In combination with the upper pot of a culinary double boiler, said pot having a handle extending radially therefrom at its top, a fender provided at the top of the pot and comprising a top portion extending radially from and about the top of the pot and a flange portion depending from the top portion outwardly of the pot and provided with a radial opening therethrough and extending as a notch from the bottom of the flange portion only to a top point thereof spaced below the top portion of the fender freely receiving the pot handle to extend beyond the flange, said top portion and flange being cooperative with the pot to provide an inverted channel for intercepting steam escaping from the lower pot of the double boiler and said flange portion being provided with a fluid-escape opening above the level of said top point of the notch.

OCTAVIA E. ARMSTRONG.

REFERENCES CITED

The following references are of record in the file of this patent:

UNITED STATES PATENTS

| Number | Name | Date |
|---|---|---|
| 2,288,795 | Earl | July 7, 1942 |
| 1,698,225 | Dick | Jan. 8, 1929 |
| 1,708,921 | Hoffman et al. | Apr. 9, 1929 |
| 2,079,281 | Duarte | May 4, 1937 |
| 1,453,278 | Clifford | May 1, 1923 |
| 1,622,587 | Housel | Mar. 29, 1927 |

FOREIGN PATENTS

| Number | Country | Date |
|---|---|---|
| 747,335 | France | Mar. 28, 1933 |
| 778,350 | France | Dec. 22, 1934 |